United States Patent
Oh et al.

(10) Patent No.: US 9,836,428 B2
(45) Date of Patent: Dec. 5, 2017

(54) REDUCING UNWANTED REFLECTIONS IN SOURCE-TERMINATED CHANNELS

(71) Applicant: Rambus Inc., Sunnyvale, CA (US)

(72) Inventors: Kyung Suk Oh, Cupertino, CA (US); Pravin Kumar Venkatesan, Santa Clara, CA (US); Yohan Usthavia Frans, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 364 days.

(21) Appl. No.: 14/411,723

(22) PCT Filed: Jul. 17, 2013

(86) PCT No.: PCT/US2013/050945
§ 371 (c)(1),
(2) Date: Dec. 29, 2014

(87) PCT Pub. No.: WO2014/015071
PCT Pub. Date: Jan. 23, 2014

(65) Prior Publication Data
US 2015/0205751 A1    Jul. 23, 2015

Related U.S. Application Data

(60) Provisional application No. 61/674,097, filed on Jul. 20, 2012.

(51) Int. Cl.
*G06F 13/42* (2006.01)
*H03K 17/16* (2006.01)
*G06F 13/28* (2006.01)
*H04L 25/02* (2006.01)

(52) U.S. Cl.
CPC .......... *G06F 13/4221* (2013.01); *G06F 13/28* (2013.01); *H04L 25/0278* (2013.01); *H04L 25/0298* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,369,605 B1 | 4/2002 | Bonella et al. | |
| 2003/0039151 A1* | 2/2003 | Matsui | G11C 7/1006 365/195 |
| 2008/0007290 A1 | 1/2008 | Kubo | |

(Continued)

OTHER PUBLICATIONS

PCT International Search Report and Written Opinion, PCT/US2013/050945, dated Apr. 10, 2014, 13 Pages.

*Primary Examiner* — Hyun Nam
(74) *Attorney, Agent, or Firm* — Fenwick & West LLP (57) ABSTRACT

A memory controller and/or memory device control termination of a communication link in order to achieve power savings while reducing or eliminating unwanted reflections in the channel. Following transmission of data over the communication channel, termination is left enabled for a programmable time period beginning immediately following completion of the transmission. The time period is sufficiently long to allow the unwanted reflections to be absorbed by the termination. Following the time period, the termination is disabled for power savings.

19 Claims, 6 Drawing Sheets

(56) References Cited

U.S. PATENT DOCUMENTS

| | | | |
|---|---|---|---|
| 2010/0013516 A1* | 1/2010 | Kyung | G11C 7/1072 326/30 |
| 2011/0141829 A1 | 6/2011 | Ware | |
| 2011/0267101 A1 | 11/2011 | Oh et al. | |
| 2011/0314200 A1 | 12/2011 | Wilson et al. | |
| 2012/0256655 A1* | 10/2012 | Kim | H03K 19/01855 326/30 |
| 2012/0326746 A1* | 12/2012 | McCall | G11C 7/1045 326/30 |

* cited by examiner

REDUCING UNWANTED REFLECTIONS IN SOURCE-TERMINATED CHANNELS

BACKGROUND

The present disclosure generally relates to reducing reflections in source-terminated channels.

Input/Output (I/O) circuits are commonly included in integrated circuit devices such as memory devices and memory controllers to transmit and receive data and/or control signals over one or more communication links. The drivers and/or receivers of the I/O circuits may include on-chip termination circuits to improve impedance matching between the I/O circuits and the communication links and reduce unwanted reflections.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

A memory controller and/or a memory device control termination associated with a related communication link. In several embodiments described herein, the termination is controlled in a way that achieves low power consumption while reducing or eliminating unwanted reflections in the link. Following transmission of data over the communication link, termination is left enabled, e.g., by one the devices, for a programmable time period following completion of the transmission. The time period may be sufficiently long enough to allow the unwanted reflections to be absorbed by the termination. Following the programmable time period, the termination may be disabled for power savings. The termination may be embodied as either an output impedance of a driver circuit transmitting over the communication channel or as an explicit termination circuit (such as a resistive circuit element) separate from the driver circuit. One or more of technique described herein for controlling termination may be applied to a variety of integrated circuit devices of memory systems including, for example, double data rate (DDR) memory systems, low power double data rate memory systems (e.g., LPDDR, LPDDR2, LPDDR3, etc.), low power systems based on mobile extreme data rate (XDR) or low power memory (LPM) standards, and other memory systems.

Figure 1:
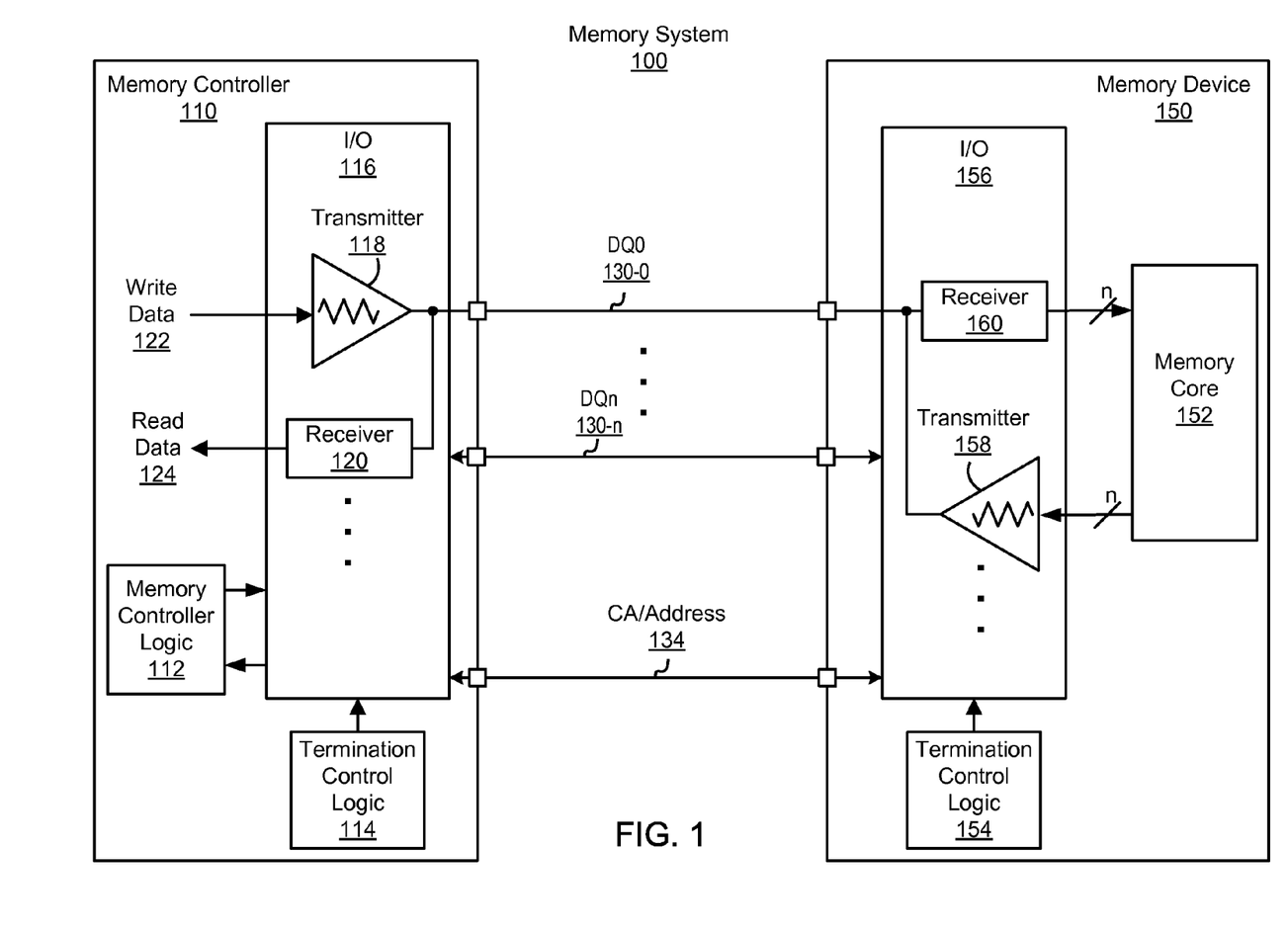
FIG. 1 is a system diagram illustrating an embodiment a memory system.

FIG. 1 illustrates an embodiment of a memory system 100 comprising a memory controller 110 coupled to a memory device 150. Memory controller 110 and memory device 150 communicate via a plurality of communication links including data lines DQ0 through DQn 130 and command/address line 134. Some embodiments may include additional communication links not illustrated in FIG. 1 for simplicity of description. In one embodiment, the communication links 130, 134 use signal-ended signaling. In alternative embodiments, differential signaling may be used.

Memory device 150 may be a DRAM (dynamic random access memory), SRAM (static random access memory), a non-volatile memory such as a flash memory, or any other type of memory device. Memory device 150 includes memory core 152, termination control logic 154, and input/output device 156 including a transmitter 158 and a receiver 160. For simplicity of illustration, only a single transmitter 158 and receiver 160 are shown in I/O 156 communicating via communication link DQ0 130-0. In practice, I/O 156 may have multiple transmitters 158 and receivers 160 for communicating over the other communication links (e.g., DQ1-DQn and CA/Address 134). Furthermore, in one embodiment, a multiplexing scheme may be used to allow transmitter 158 and receiver 160 to communicate over two or more different communication links.

Memory controller 110 comprises memory controller logic 112, termination control logic 114, and input/output (I/O) circuit 116 including a transmitter 118 and a receiver 120. For simplicity of illustration, only a single transmitter 118 and receiver 120 are shown in I/O 116 communicating over a communication link DQ0 130-0. In practice, I/O 116 may have multiple transmitters 118 and receivers 120 for communicating over the other communication links (e.g., DQ1-DQn and CA/Address 134). Furthermore, in one embodiment, a multiplexing scheme may be used to allow transmitter 118 and receiver 120 to communicate over two or more different communication links.

Other components present in memory controller 110 and memory device 150 not directly necessary for illustrating the embodiments herein are omitted for simplicity of illustration. Furthermore, embodiments described herein in the context of memory controller 110 transmitting data signals to memory device 150 for write operations may similarly be used for transmission of data signals from memory device 150 to memory controller 110 for read operations and vice versa. Furthermore, while the embodiments herein will be explained in the context of transmission of data signals between memory controller 110 and memory device 150, the embodiments herein may equally be used for transmission of command/address signals.

In one embodiment, memory controller 110 and memory device 150 may be implemented as separate dies within the same package. In other embodiments, they are implemented in their own respective packages.

Memory controller logic 112 generates various command/address signals (CA/Address) to transmit to memory device 150 via CA/Address link 134 to control the operation of memory device 150 and read or write data from/to memory 150. For example, in a write operation, write data 122 is transmitted from memory controller 110 to memory device 150 via data lines DQ0-DQn 130 following a write command sent from memory controller 110 via CA/Address link 134. In a read operation, read data 124 is transmitted from memory device 150 to memory controller 110 via data lines DQ0-DQn 130 following a read command sent from memory controller 110 via CA/Address link 134.

Termination control logic 114 controls (e.g., enables and disables) a source termination of the communication link 130 at the transmitter 118 and/or an end termination of the communication link 130 at the receiver 120 of I/O 116. For example, in one embodiment, source termination at the transmitter 118 may be implemented as an explicit source termination circuit (e.g., a resistive circuit element that may be an on-die termination or an external circuit) that can be enabled or disabled by controlling switches that couple or decouple the source termination circuit from the communication link 130. In another embodiment, the source termination at the transmitter 118 is embodied as a driver output impedance of transmitter 118. In this embodiment, enabling and disabling the source termination may involve enabling and disabling the driver itself. In yet another embodiment, source termination may be implemented through a combination of an explicit source termination circuit and the driver output impedance. Similarly, an end termination at the receiver 120, if present, may be implemented as an explicit end termination circuit, as an input impedance of receiver 120, or both. Termination control logic 114 may similarly control other transmitters/receivers (not shown) of I/O 116 coupled to the other communication links (e.g., DQ1-DQn and CA/Address 134).

Memory core 152 includes a number of memory cells that store write data received from memory controller 110 and/or output read data to transmit to memory controller 110 in response to applicable respective command/address signals received from memory controller 110 sent via CA/Address link 134. Termination control logic 154 controls (e.g., enables and disables) source termination at the transmitter 158 and/or an end termination at the receiver 160 of I/O 156. Source termination at the transmitter 158 may be implemented, for example, as an explicit source termination circuit or as a driver output impedance of transmitter 158. Similarly, end termination at the receiver 160, if present, may be implemented as an explicit end termination circuit input impedance of receiver 160. Termination control logic 154 may similarly control other transmitters/receivers (not shown) of I/O 156 coupled to other communication links.

Figure 2A:
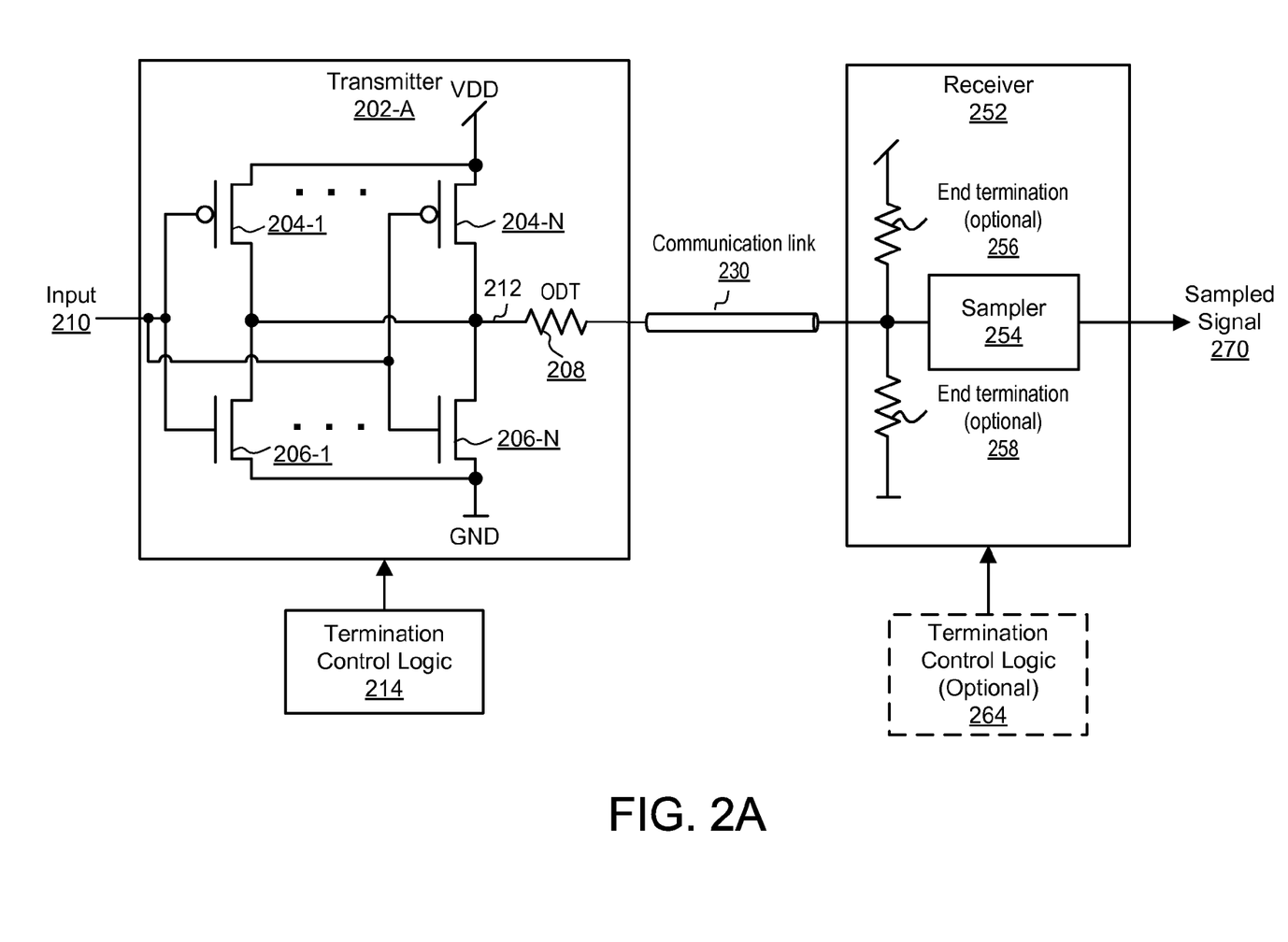
FIG. 2A is a system diagram illustrating a first embodiment of a transmitter and receiver coupled via a communication link.

FIG. 2A illustrates a first embodiment of a transmitter 202-A coupled to a receiver 252 via communication link 230. The transmitter 202-A may comprise, for example, a transmitter in an I/O device of a memory controller (such as transmitter 118) or a transmitter in an I/O device of a memory device (such as transmitter 158). Similarly, the receiver 252 may comprise, for example, a receiver in an I/O device of a memory controller (such as receiver 120) or a receiver in an I/O device of a memory device (such as receiver 160). Communication link 230 may represent a data line (e.g., DQ0-DQn 130) a command line (e.g., CA/Address 134), or another communication channel.

In one embodiment, transmitter 202-A comprises a driver circuit including N parallel complementary pairs of transistors 204, 206 (e.g., PMOS and/or NMOS transistors) and an on-die termination 208 (e.g., a series resistor). In the illustrated embodiment of transmitter 202-A, an input signal 210 is inverted to produce a driver output signal 212 having an inverted logical state. For example, when a logical "0" is input to the transmitter 118, parallel transistors 204 pull driver output signal 212 up to VDD. When a logical "1" is input to the transmitter 118, parallel transistors 206 pull driver output signal 212 down to GND. In an alternative configuration, a non-inverting transmitter may be used. The parallel transistors 204 and the parallel transistors 206 have an internal impedance that contributes to the overall output impedance of transmitter 202-A. These output impedances in combination with the impedance of resistor 208 thereby represent a source termination of communication link 130.

Receiver 252 comprises a sampler 254 for sampling signals received over communication link 230 to produce a sampled signal 270. Optionally, receiver 252 may include an end termination implemented as, for example, a pull-up resistor 256, a pull-down resistor 258, or both. These optional end terminations 256, 258 may be implemented as on-die terminations or external components. Different types of memory systems may include different combinations of pull-up resistor 256 and pull-down resistor 258. For example, when end termination is not present at the receiver 252 end of the communication link 230, the communication link 230 is referred to as a single-terminated or source-terminated channel. Single-terminated channels (without end terminations 256 or 258) may be used in low power applications such as low power double data rate memory systems (e.g., LP-DDR, LPDDR2, LPDDR3, etc.). When terminations are present at both the transmitter 202-A side and receiver 252 side of the communication link 230, the communication link 230 is referred to as a double-terminated channel. For example, systems using a stub-series terminated logic (SSTL) signaling standard may include both pull-up resistor 256 and pull-down resistor 258. Systems using a Pseudo Open-Drain Logic (PODL) signaling standard may include pull-up termination resistor 256 to VDD but lack pull-down resistor 258. Systems using Near Ground Signaling (NGS) may include pull-down termination resistor 258 to GND, but lack pull-up resistor 256.

Termination control logic 214 controls source termination at the transmitter 118 by enabling or disabling one or more of the components contributing to the output impedance of transmitter 202-A. For example, termination control logic 214 may control switches (not shown) that couple or decouple one or more of the transistors 204, 206 from driver output 212. By enabling or disabling different combinations of transistors 204, 206, different impedances can be achieved, thus controlling the source termination of communication link 230. In one embodiment, controlling source termination involves enabling and disabling the driver itself. For example, by disabling all of the transistors 204, 206, the driver output signal 212 becomes tri-stated and placed in a high impedance state. In contrast, if only a subset of transistors 204, 206 are disabled, the driver is still active, but the output impedance will no longer sufficiently match to effectively terminate the communication link 230.

In one embodiment, termination control logic 214 is configured to disable the source termination by disabling one or more of the driver transistors 204, 206 (and/or a separate termination circuit) during some idle period when the transmitter 202-A is not transmitting data (or commands) to reduce power consumption. For example, in one embodiment, the termination control logic 214 tri-states driver output 212 to a high impedance state by decoupling the driver transistors 204, 206 from the driver output 212. However, disabling the termination too early after a data transmission can cause unwanted reflections in the communication link 230. These reflections may be particularly problematic in the case where there is no end termination (i.e., resistors 256, 258 are absent in the receiver 252) such as in low power memory interface applications. Furthermore, the reflections may still be problematic in the double-terminated applications (e.g., PODL, NGS, and SSTL applications) since the end termination alone may be insufficient to reduce the reflections at the desired rate, particularly in high speed systems.

To reduce or eliminate the problem of unwanted reflections, the termination control logic 214 leaves the source termination enabled (e.g., coupled to the driver output 212) for a time period following completion of transmission. This time period is sufficient to allow reflections from the transmission to be absorbed by the source termination to reduce channel noise below a desired threshold level. Following the time period, termination control logic 214 disables the source termination (e.g., decouples one or more of the components contributing to the output impedance of the transmitter 202-A from the driver output 212).

The particular components that are enabled during the time period following transmission may depend on the particular transmitter and receiver architecture. For example, in one embodiment, all of the driver transistors are left enabled (coupled to driver output 212) for the time period following completion of transmission. In systems using PODL signaling (pull-up termination resistor 256 is present), only pull-up transistors 204 may be left enabled (coupled to driver output 212) during the time period following transmission while pull-down transistors 206 are disabled (decoupled from driver output 212) during the time period following transmission. This configuration avoids a current path from Vdd to GND, thereby reducing power consumption. In systems using NGS, (pull-down termination resistor 258 is present), only pull-down transistors 206 may be left enabled during the time period following transmission while pull-up transistors 204 are disabled during the time period. In other embodiments, where an explicit termination circuit is used, the entire driver itself may be tri-stated (high impedance state) immediately following transmission, so long as the explicit source termination is left enabled during the time period following transmission.

In one embodiment, the length of the time period during which termination is enabled following transmission is controlled by a programmable register in the termination control logic 214. In another embodiment, the length of the time period is controlled via an external pin that receives a command to enable or disable the termination. The time period may be set based on, for example, various channel characteristics and noise requirements. For example, in one embodiment, the time period is related to the propagation time across the communication link 230 (e.g., approximately twice the propagation time). In another embodiment, the time period is related to the channel rate for transmitting a particular number of bits (e.g., 2, 4, or 8 bits). Generally, the time period is long enough to substantially reduce the reflections in the communication link 230 following transmission below an acceptable level.

In one embodiment, optional termination control logic 264 may control (e.g., enable or disable) the end termination, if present, at the receiver 252. For example, termination control logic 264 may control switches (not shown) that couple or decouple resistors 256, 258 from the communication link 230. In order to reduce or eliminate unwanted reflections caused by disabling one or more components contributing to the end termination, the termination control logic 264 leaves the end termination enabled for a time period immediately following receipt of a transmission. This time period is sufficient to allow reflections from the transmission to be reduced below a desired threshold level. Following the time period, termination control logic 264 disables the end termination (e.g., disables one or more of the components contributing to the receiver impedance).

In one embodiment termination control logic 264 controls end termination 256, 258 based on a termination control signal received via a command link (e.g., CA/Address link 134) from the transmitter 202-A. Alternatively, the termination control signal may be received via a dedicated termination control link.

Figure 2B:
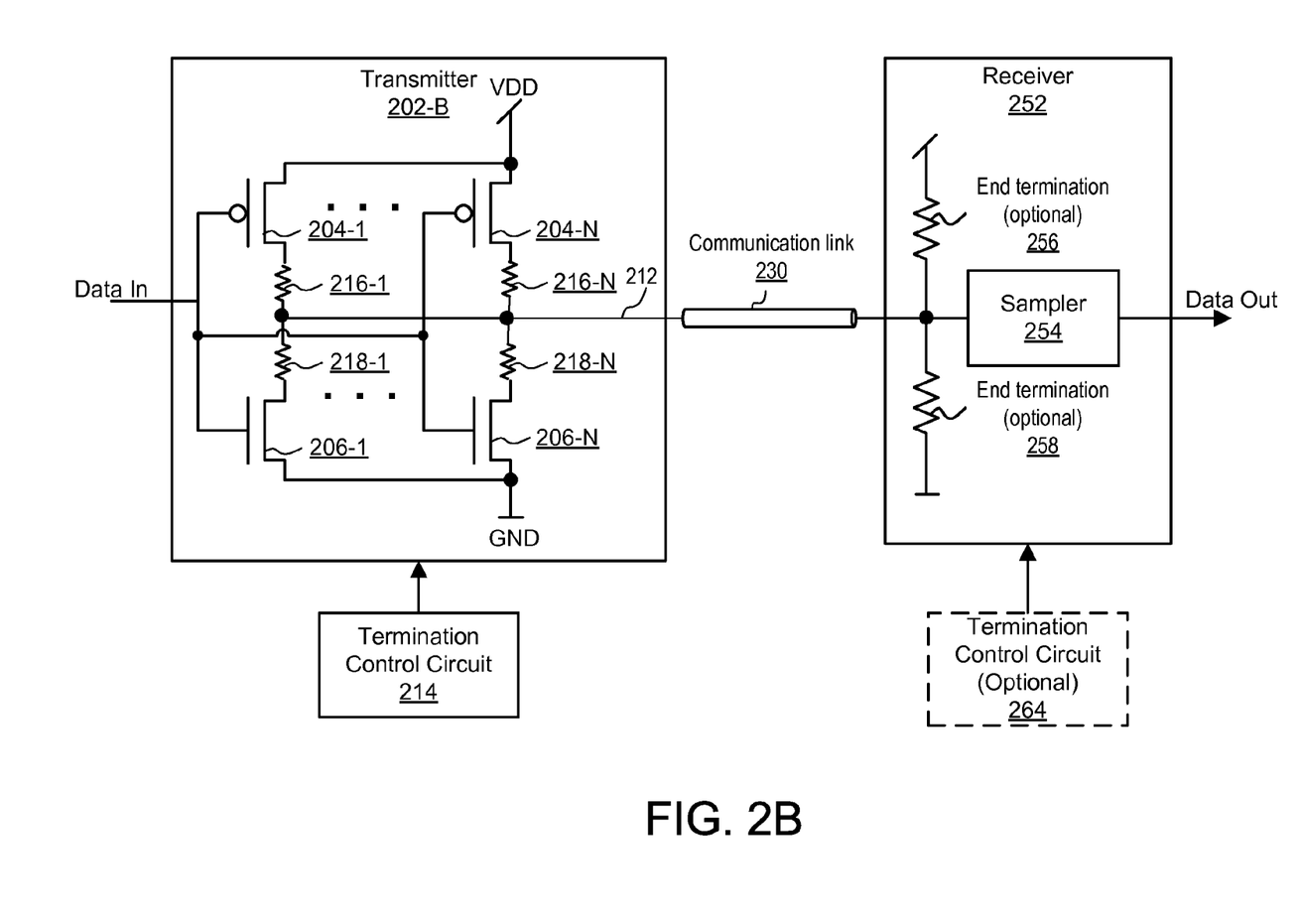
FIG. 2B is a system diagram illustrating a second embodiment of a transmitter and receiver coupled via a communication link.

FIG. 2B illustrates an alternative architecture of a transmitter 202-B. In this alternative architecture, transmitter 202-B lacks series on-die termination 208, and instead includes resistors 216, 218 in series with each transistor 204, 206. As described above, different segments (i.e., transistor and series resistor) can be disabled or enabled to provide a desired termination value via series switches (not shown) that couple or decouple the segments to the driver output 212. Furthermore, different components of the driver can be enabled or disabled to control termination in the same manner described above.

Figure 2C:
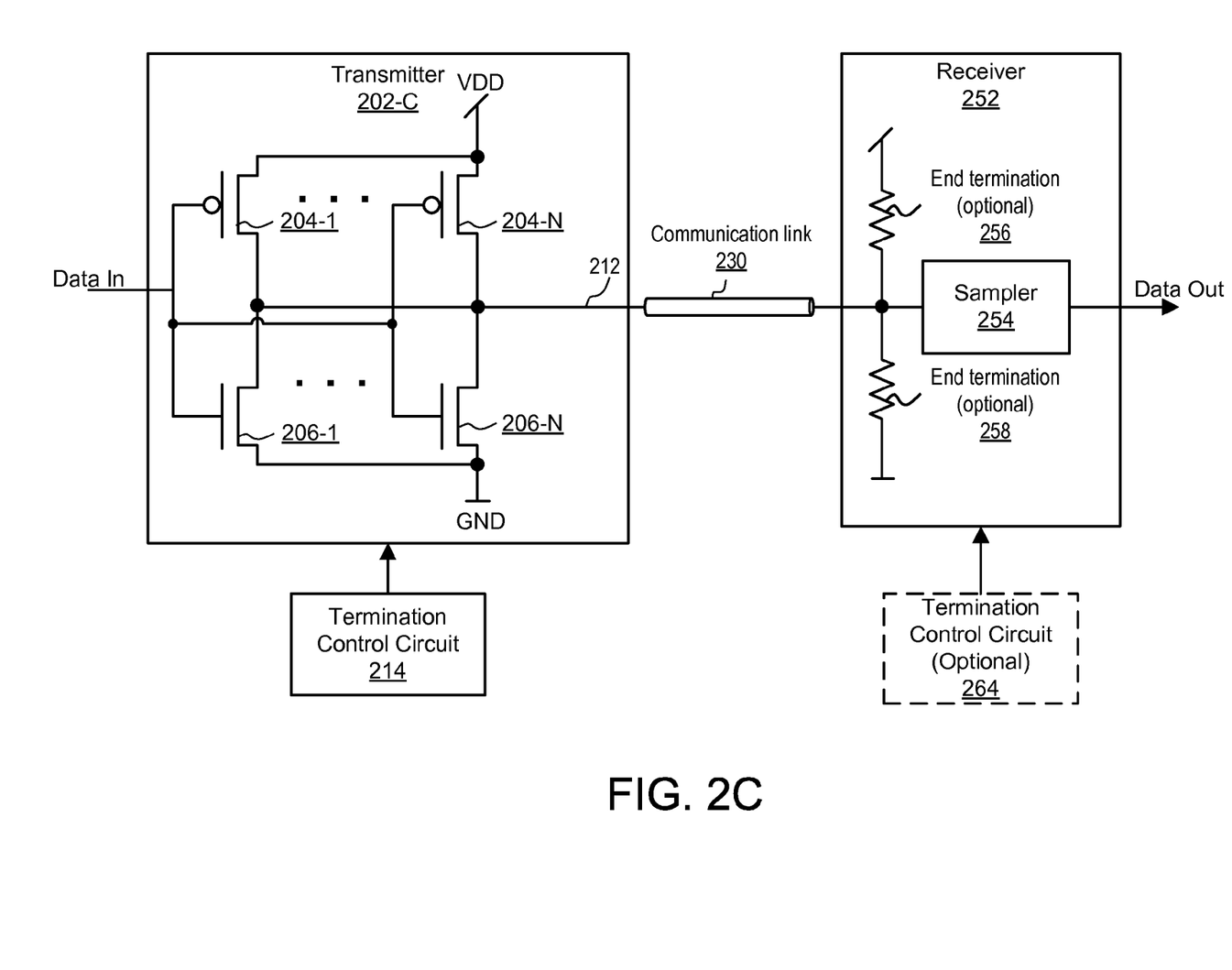
FIG. 2C is a system diagram illustrating a third embodiment of a transmitter and receiver coupled via a communication link.

FIG. 2C illustrates another alternative architecture of a transmitter 202-C. In this alternative architecture, the output impedance of transmitter 202-C is dictated only by the impedance of the transistors 204, 206 and no additional resistors (e.g., resistor 208 in FIG. 2A and resistors 216, 218 in FIG. 2B) are present. Other alternative architectures of transmitter 202 are also possible.

Figure 3:
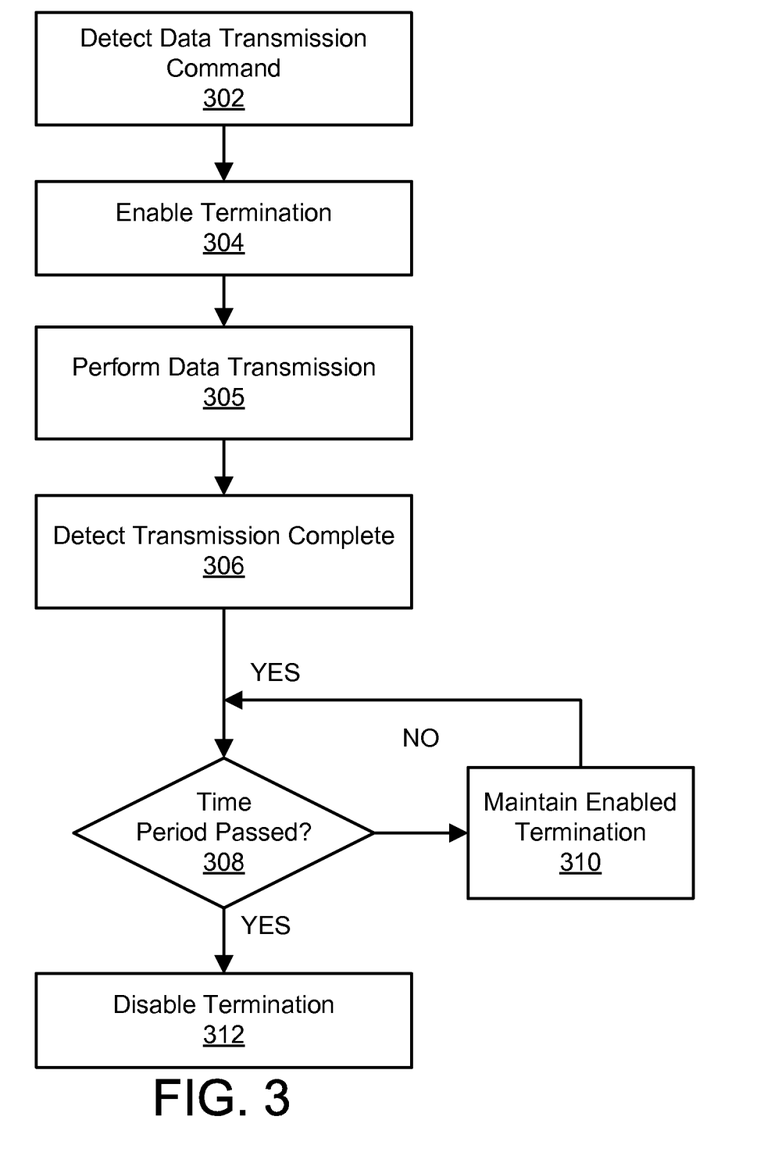
FIG. 3 is flowchart illustrating a process for controlling termination of a communication link.

FIG. 3 illustrates an embodiment of a process for controlling termination of a transmitter and/or a receiver. Although, this example is shown in the context of a source termination of a transmitter, the process may be similarly applied to an end termination of a receiver. In step 302, a data transmission command is detected. For example, termination control logic 214 may detect that the memory controller 110 has transmitted a data write or data read command indicating that data will be soon be transmitted via data lines DQ0-DQn. In step 304, the termination control logic 214 enables termination. For example, where termination is achieved via an output impedance of a driver, the termination control logic 214 enables the appropriate driver components to achieve the termination. Furthermore, the termination control logic 214 may enable an on-die termination, if present. In step 305, the transmitter performs the data transmission. In step 306, the termination control logic 214 detects that the data transmission is complete. This triggers the start of a time period represented by decision block 308. If the time period has not passed, the termination control logic 214 maintains the termination in its enabled state as shown in step 310. By continuing to enable termination after completion of the data transmission, unwanted reflections in the communication channel may be absorbed. After the time period passes, the termination control logic 214 disables the termination in step 312.

Figure 4:
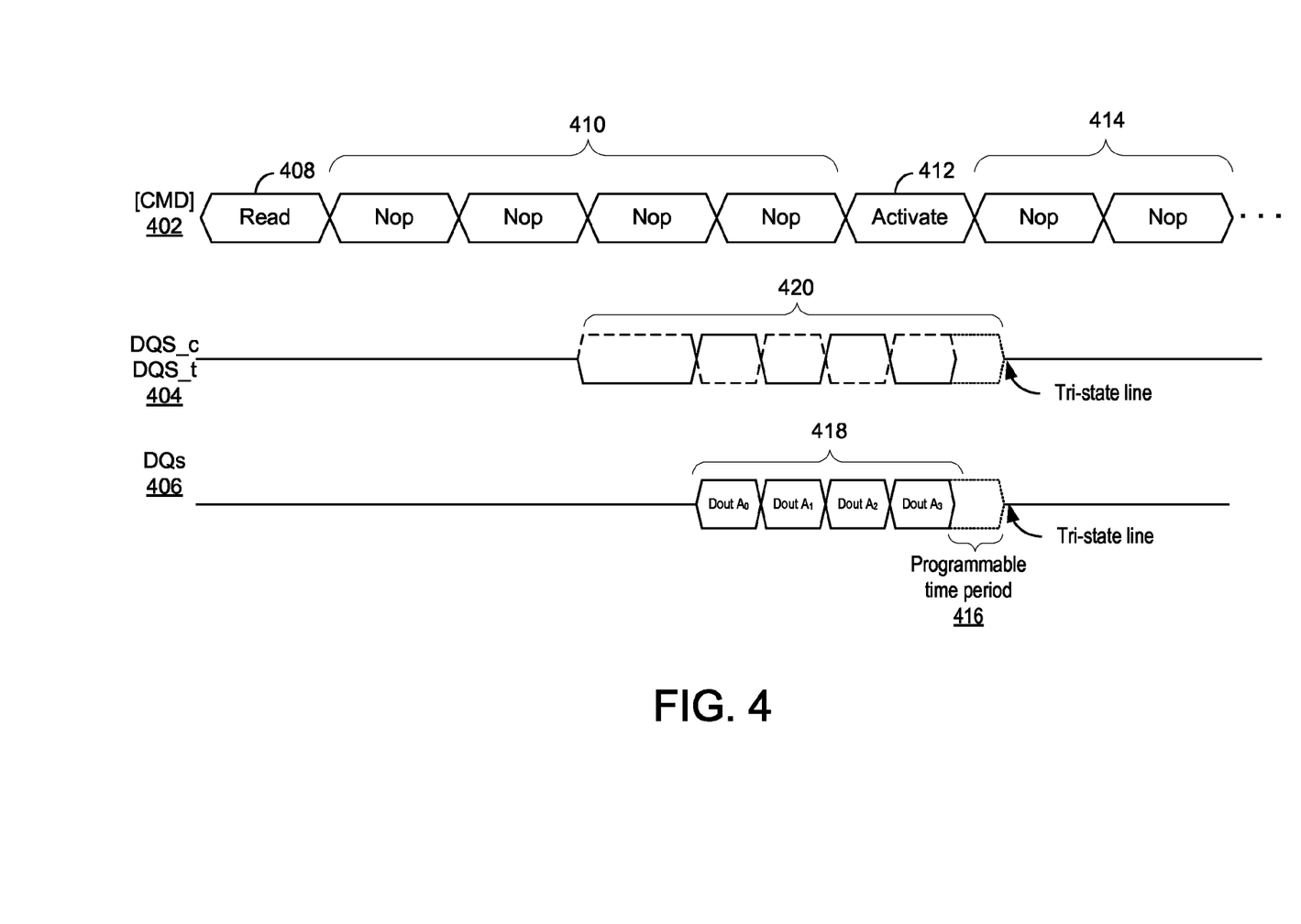
FIG. 4 is a timing diagram illustrating exemplary commands and data transmitted in a memory system in accordance with one embodiment.

FIG. 4 is a timing diagram illustrating exemplary commands and data transmitted in memory system 100 for a read operation between a memory controller 110 and a memory device 150. Command signal lines 402 communicate commands sent from the memory controller 110 to the memory device 150. As illustrated in this example, the memory controller 110 sends a read command 408 followed by a number of Nop signals 410. An activate signal 412 is then followed by additional Nop signals 414. Memory device 150 responds to the read command 408 by transmitting read data 418 and a read data strobe 420 to the memory controller 110. The read data strobe 420 is sent along with the data 418 (in this case by the memory device 150) and its edges are used to sample the data 418 (in this case by the memory controller 110). DQS_c and DQS_t lines 404 communicate the read data strobe signal following the read command 408. In an alternative embodiment, the read data strobe 420 can be represented by a single ended signal on a single communication line. DQS_c and DQS_t lines 404 are tri-stated prior to and following completion of the read operation 408 to avoid unnecessary power consumption. DQs lines 406 communicate the data 418 read from the memory device 150 and sent by the memory device in response to the read operation 408. Signal lines for DQs 406 are also tri-stated prior to and following completion of the read operation 408 to avoid unnecessary power consumption.

In order to reduce or eliminate unwanted reflections on the DQs lines 406 and DQS_c/DQS_t lines 404, the respective transmitters for these lines are left enabled for a programmable time period 416 following completion of data transmission. This time period enables the reflections to be absorbed by the line termination. The lines 404, 406 are then tri-stated following the programmable time period 416.

In other embodiments where an explicit termination exists separate from the driver, the driver itself may still be disabled prior to the programmable time period 416 (e.g., immediately following completion of transmission), while the separate termination remains enabled during the programmable time period 416. The separate termination may then be disabled following the programmable time period 416.

Upon reading this disclosure, those of ordinary skill in the art will appreciate still alternative structural and functional designs for reducing reflection in source-terminated channels, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. An integrated circuit device comprising:
a driver circuit to transmit data over a communication link to a receiver circuit, the driver circuit being terminated by a termination for the communication link, wherein the termination comprises an internal impedance of one or more transistors of the driver circuit; and
a termination control circuit to enable the termination while the driver circuit is transmitting data over the communication link, the termination being enabled by the termination control circuit during a time period beginning immediately following completion of transmitting the data, the termination control circuit to disable the termination after the time period by decoupling the one or more transistors of the driver circuit from the communication link after the time period.

2. The integrated circuit device of claim 1, wherein the termination further comprises a resistive circuit element separate from the driver circuit, and wherein the termination control circuit further decouples the resistive circuit element from the communication link after the time period.

3. The integrated circuit device of claim 2, wherein the resistive circuit element is external to the integrated circuit.

4. The integrated circuit device of claim 1, further comprising:
a programmable register to set the time period for disabling the termination following completion of transmitting the data over the communication link.

5. The integrated circuit device of claim 1, further comprising:
a pin to receive a termination control signal from an external controller, the termination control signal to cause the termination control circuit to disable or enable the termination.

6. The integrated circuit device of claim 1, wherein the termination control circuit futher generates a control signal that turns off an on-die termination of a receiver after the time period following completion of receipt of the data over the communication link.

7. The integrated circuit device of claim 1, wherein the integrated circuit is a memory device.

8. The integrated circuit device of claim 1, wherein the integrated circuit is a memory controller.

9. A method for controlling termination of a communication link between a driver circuit and a receiver circuit, the method comprising:
transmitting data over the communication link from the driver circuit to the receiver circuit, the driver circuit terminated by a termination for the communication link;
enabling the termination of the communication link during transmission of the data over the communication link, wherein enabling the termination comprises coupling one or more transistors of the driver circuit having an internal impedance to the communication link;
continuing to enable the termination for a time period beginning immediately following completion of the transmission of the data over the communication link; and
disabling the termination after the time period, wherein disabling the termination comprises decoupling the one or more transistors of the driver circuit from the communication link.

10. The method of claim 9, wherein enabling the termination further comprises coupling a resistive element to the communication link, the resistive element being separate from the driver circuit, and wherein disabling the termination further comprises decoupling the resistive element from the communication link.

11. The method of claim 9, further comprising:
reading a programmable register to determine the time period.

12. The method of claim 9, further comprising:
receiving a termination control signal via a pin on an integrated circuit device; and
enabling or disabling the termination responsive to the termination control signal.

13. An integrated circuit device comprising:
a driver circuit to transmit data over a communication link, the driver circuit being terminated by a driver-side termination for the communication link, wherein the driver-side termination comprises an internal impedance of one or more transistors of the driver circuit;
a receiver circuit to receive the data over the communication link from a driver circuit, the receiver circuit being terminated by a receiver-side termination for the communication link and the receiver-side termination comprising a resistive circuit element;
a driver-side termination control circuit to enable the driver-side termination while the driver circuit is transmitting the data over the communication link, the driver-side termination being enabled by the driver-side termination control circuit during a first time period beginning immediately following completion of transmitting the data, the driver-side termination control circuit disable the driver-side termination after the first time period by decoupling the one or more transistors of the driver circuit from the communication link after the first time period,
a receiver-side termination control circuit to enable the receiver-side termination while the receiver circuit is receiving the data over the communication link, the receiver-side termination being enabled by the receiver-side termination control circuit during a second time period beginning immediately following completion of receipt of the data over the communication link, the receiver-side termination control circuit to disable the receiver-side termination after the second time period; and a second programmable register to set the time period for disabling the receiver-side termination following completion of the receipt of the data over the communication link.

14. The integrated circuit device of claim 13, wherein the receiver-side termination control circuit disables the receiver-side termination responsive to a control signal received by the receiver via a memory address link between a memory device and a memory controller.

15. The integrated circuit device of claim 13, wherein the receiver-side termination control circuit disables the receiver-side termination circuit responsive to an on-die termination enable signal received by the receiver via a dedicated termination control link between a memory device and a memory controller.

16. A method for controlling termination of a communication link between a driver circuit and a receiver circuit, the method comprising:

transmitting data over the communication link from the driver circuit to the receiver circuit, the driver circuit terminated by a driver-side termination for the communication link;

enabling the driver-side termination of the communication link during transmission of the data over the communication link, wherein enabling the driver-side termination comprises coupling one or more transistors of the driver circuit having an internal impedance to the communication link;

receiving at the receiver circuit, the data transmitted over the communication link from the driver circuit, the receiver circuit being terminated by a receiver-side termination for the communication link;

enabling the receiver-side termination to terminate the communication link while receiving the data over the communication link;

continuing to enable the driver-side termination for a first time period beginning immediately following completion of the transmission of the data over the communication link;

continuing to enable the receiver-side termination for a second time period, the second time period beginning immediately following completion of reception of the data over the communication link;

disabling the driver-side termination after the first time period, wherein disabling the termination comprises decoupling the one or more transistors of the driver circuit from the communication link; and disabling the second termination after the second time period.

17. The method of 16, further comprising:

reading a programmable register to determine the second time period.

18. The method of claim 16, wherein disabling the termination comprises:

disabling the receiver-side termination responsive to a control signal received by the receiver via a memory address link between a memory device and a memory controller.

19. The method of claim 16, wherein disabling the termination comprises:

disabling the receiver-side termination responsive to an on-die termination enable signal received by the receiver via a dedicated termination control link between a memory device and a memory controller.

* * * * *